United States Patent [19]

Vidotto et al.

[11] 4,315,843
[45] Feb. 16, 1982

[54] THIN FILM MONOMER REMOVAL FROM POLYVINYL CHLORIDE LATEXES

[75] Inventors: Graziano Vidotto, Padova; Febo Sellan, Treviso; Enzo Bacchetta, Scorze'; Sandro Mainardi, Marghera; Giovanni Benussi, Mestre, all of Italy

[73] Assignee: Montedison S.p.A., Milan, Italy

[21] Appl. No.: 153,605

[22] Filed: May 27, 1980

[30] Foreign Application Priority Data

May 28, 1979 [IT] Italy ................ 23036 A/79

[51] Int. Cl.$^3$ ............................. C08F 6/16
[52] U.S. Cl. ................ 260/29.6 PT; 159/6 R; 159/13 A
[58] Field of Search ................ 260/29.6 PT

[56] References Cited

U.S. PATENT DOCUMENTS

| 3,371,059 | 2/1968 | Rich | 260/29.6 PT |
| 4,020,032 | 4/1977 | Kalka et al. | 260/29.6 PT |
| 4,130,527 | 12/1978 | Miller et al. | 260/29.6 R |
| 4,151,141 | 4/1979 | Moore et al. | 260/29.6 PT |
| 4,158,092 | 6/1979 | Bötsch et al. | 260/29.6 PT |

FOREIGN PATENT DOCUMENTS

| 2283154 | 3/1976 | France . |
| 1499732 | 2/1978 | United Kingdom . |
| 1508813 | 4/1978 | United Kingdom . |
| 1509127 | 4/1978 | United Kingdom . |
| 1553828 | 10/1979 | United Kingdom . |

Primary Examiner—Stanford M. Levin
Attorney, Agent, or Firm—Stevens, Davis, Miller & Mosher

[57] ABSTRACT

A process for extracting vinyl chloride monomer from polyvinyl chloride latexes is disclosed, characterized in that the latex is continuously flowed on and along a heat exchange surface in the form of a thin film having a thickness ranging from 0.5 to 1.2 mm, said latex having a temperature between 40° and 70° C. and under a pressure ranging from 45 to 210 mm Hg., and for a time ranging from 10 to 70 seconds. The gaseous vinyl chloride monomer is removed concurrently with the flow of the latex. Suitable apparatus is also disclosed.

3 Claims, 3 Drawing Figures

THIN FILM MONOMER REMOVAL FROM POLYVINYL CHLORIDE LATEXES

This invention relates to a process for extracting vinyl chloride monomer (VCM) from polyvinyl chloride latexes (PVC) and to apparatus suitable for carrying out the process.

The PVC latexes are prepared by polymerization of VCM in an aqueous emulsion. At the conclusion of the polymerization process the latex contains a high amount, even in the order of 50,000 ppmw (parts per million by weight), of residual VCM which has not reacted. The removal of the residual VCM from the latex is necessary both for the sake of recovering it for economic reasons and because its presence—in view of its toxicity—renders it very dangerous to handle the latex during its successive processings.

Generally the extraction of residual VCM from the latex is carried out by subjecting the PVC aqueous emulsion to degassing in the same polymerization reactor by heating the emulsion, at the conclusion of the polymerization reaction, to temperatures generally ranging from 70° to 80° C. and for times varying from 30 to 60 minutes.

This procedure presents several drawbacks; such a treatment requires the removal of the foams which unavoidably form due to the presence of surfactants in the emulsion, wherefore it is necessary to add, either during the polymerization step or immediately before degassing, suitable antifoaming agents. However, such a treatment may easily alter the chemical-physical characteristics of the PVC in emulsion and consequently the characteristics of the corresponding plastisols obtained with it. Furthermore, such a process, being discontinuous, presents obvious economic and practical drawbacks.

It is an object of the present invention to provide a process for extracting VCM from PVC latexes which will eliminate, or at least reduce, the above-mentioned drawbacks.

In particular, it is an object of the present invention to provide a process which permits one to thoroughly remove the VCM or at least to reduce the residual amount to values acceptable from the point of view of safety during the subsequent processings of the latex.

A further object of this invention is to provide a process which will elminate, or at least drastically reduce, the problem of foam formation.

Still another object of this invention is to provide a process which does not alter the chemical-physical characteristics of the resulting PVC in emulsion.

A still further object of the invention is to provide a continuous process as aforesaid.

These and still further objects of the invention, which one skilled in the art will readily understand from the following description, are advantageously achieved by a process for the extraction of vinyl chloride monomer from polyvinyl chloride latexes, comprising causing the latex continuously to flow on or along a heat exchange surface in the form of a thin film having a thickness ranging from 0.5 to 1.2 mm, such latex having a temperature of from 40° to 70° C. under a pressure ranging from 45 to 210 mm Hg.

The latex is made to flow continuously on or along the heat exchange surface for a time between 10 and 70 seconds.

The gaseous vinyl chloride monomer is removed concurrently with the movement of the flowing latex.

Apparatus suitable for carrying out the process consists or consists essentially of at least a vertical pipe into which the polyvinyl chloride latex is fed from the top, of a jacket external to said vertical pipe in which a heating fluid circulates, of a distributor arranged at the upper end of the vertical pipe which feeds the latex to the inside wall of said vertical pipe in the form of a thin down-flowing film, and of means suitable for creating a desired degree of vacuum inside the vertical pipe. The means suitable for creating the vacuum acts on the lower end of the vertical pipe by sucking or withdrawing the gaseous vinyl chloride monomer, which is thus separated from the latex and recovered for further use.

The distributor may have different forms. Particularly effective has proved to be a distributor having tangential holes through which the latex is fed onto the inside wall of the vertical pipe with an initial centrifugal force, thus resulting in a better and more uniform distribution of the downflowing latex film on the entire wall of the vertical pipe.

The present invention will now be described in still more detail by reference to the accompanying drawings in which.

With reference to these figures, the apparatus comprises a vertical pipe 1 into which the polyvinyl chloride latex is fed from the top, a jacket 2 external to the pipe 1 and in which a heating fluid circulates in countercurrent to the flow of latex inside pipe 1, a chamber 3 arranged on the top of pipe 1 into which the latex to be treated is fed, a distributor 4 located at the upper end of pipe 1, and inside chamber 3, which feeds the latex, which reaches chamber 3, on the inside wall of pipe 1 in the form of a thin downflowing film wetting uniformly all of the inside wall of the pipe 1 for all of its length.

Figure 2:
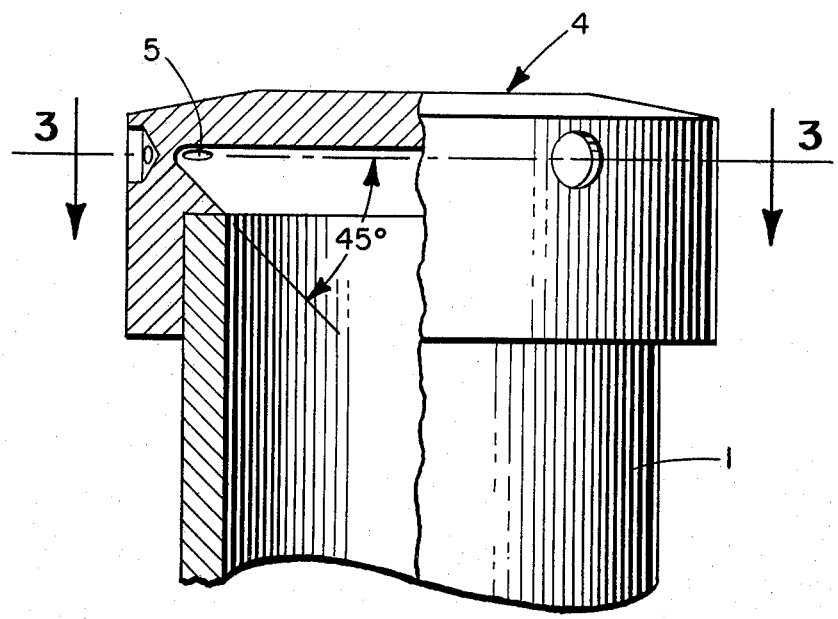
FIG. 2 is a side elevation, partially in section, of one form of distributor arranged at the upper end of the apparatus of FIG. 1.
Figure 3:
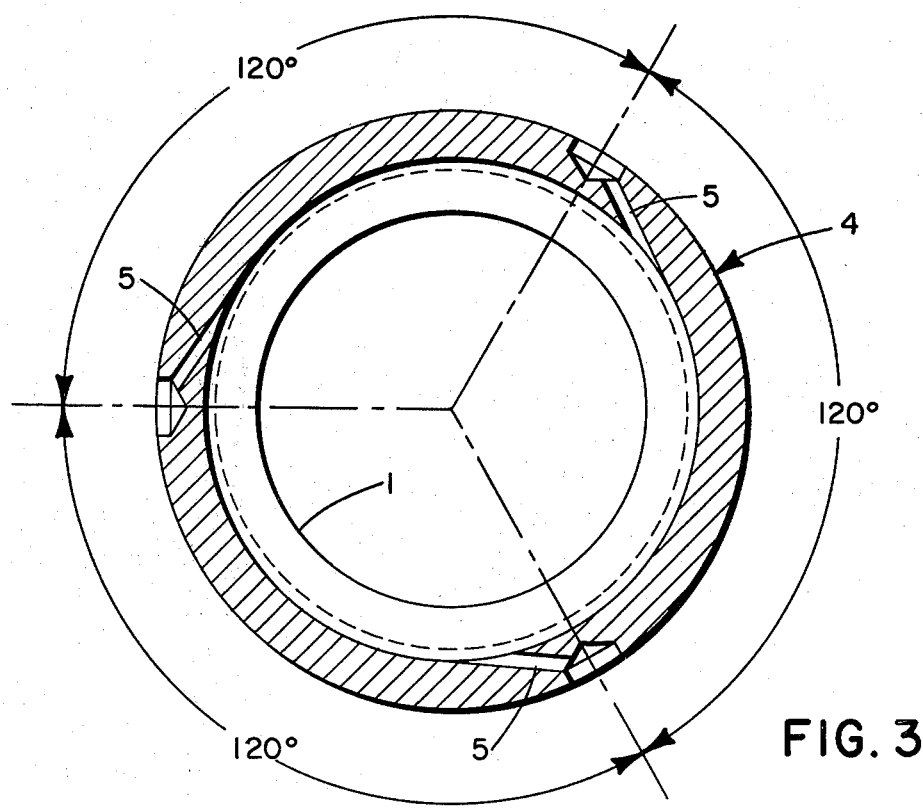
FIG. 3 is a horizontal sectional view taken along line 3—3 of FIG. 2.

Chamber 3 is fluid-tight, by means known per se, with respect to jacket 2 and pipe 1. The polyvinyl chloride latex passes from chamber 3 to pipe 1 only through the openings provided in distributor 4. As shown in FIGS. 2 and 3, these openings consist of three holes 5, the axes of which are arranged tangentially with respect to pipe 1 and which are disposed 120° from one another around the circumference of the distributor.

This distributor 4 feeds the incoming latex onto the inside wall of vertical pipe 1 with an initial centrifugal force, thereby resulting in a better and more uniform distribution of the downflowing latex film over the whole wall of pipe 1.

At the lower end of the vertical pipe 1, and directly communicating with it, a chamber 6 is provided in which the latex flowing down along the inner wall of pipe 1 is collected.

The vinyl chloride monomer, which has separated from the latex during its downflowing along the inner wall of the vertical pipe 1, is drawn from chamber 6 via pipe 7, for example by means of a conventional vacuum pump (not shown in the drawing for the sake of simplicity). The treated latex from which the vinyl chloride monomer has been removed flows out from outlet 8.

The vacuum pump, or other means known per se and useful for the purpose, which sucks the vinyl chloride monomer from the apparatus via pipe 7 creates a proper degree of vacuum in the inside of the apparatus including the vertical pipe 1, and by thus acting on the lower end of the pipe 1 sucks the gaseous vinyl chloride monomer, which is thus removed from the latex concurrently with the flowing movement of the latex inside pipe 1.

The creation of the desired degree of vacuum inside the vertical pipe 1 and acting, by means of suction, on the lower end of the pipe has proved very effective as regards the problem of preventing the formation of foams.

Figure 1:
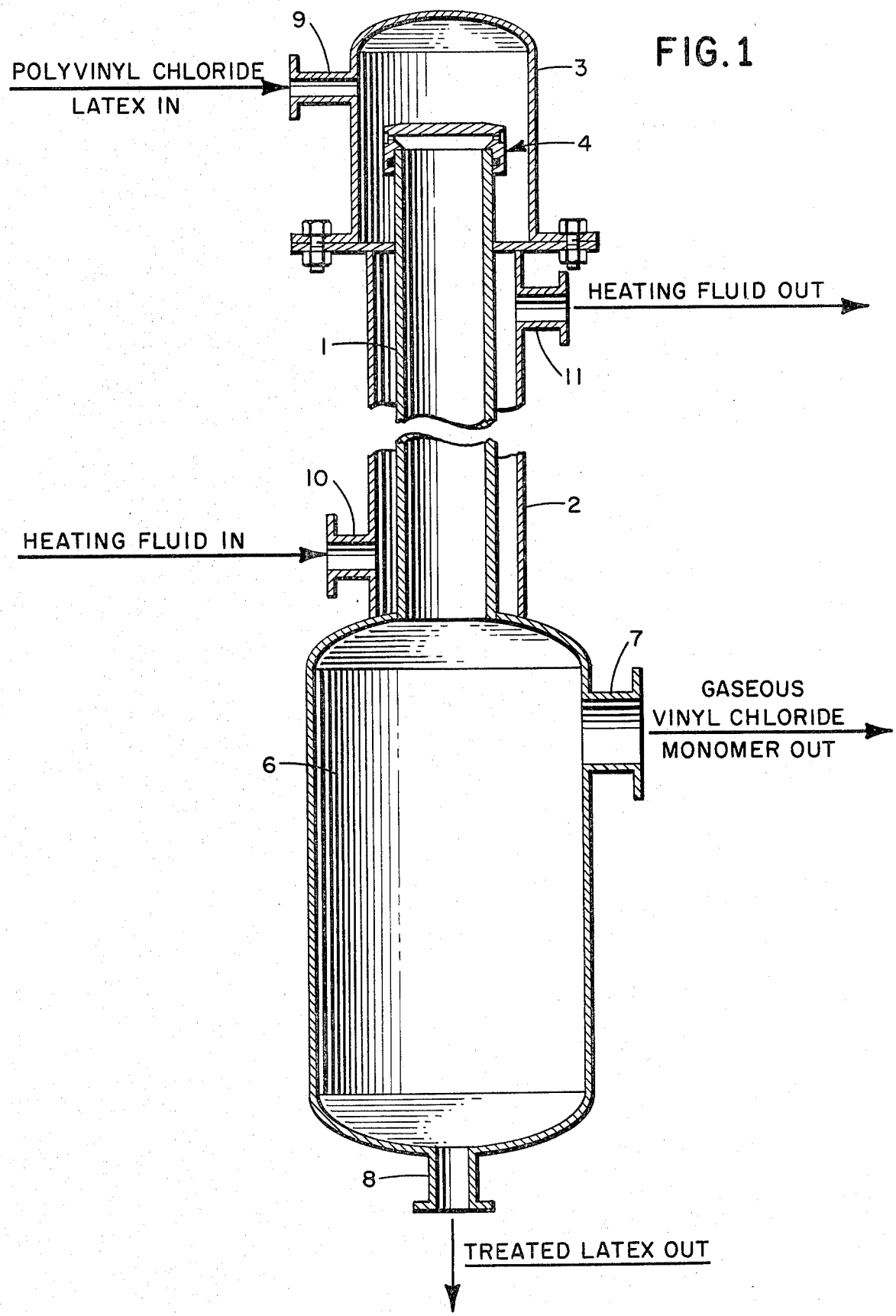
FIG. 1 shows schematically and in longitudinal section an apparatus suitable for carrying out the process.

In FIG. 1, 9 indicates the inlet of the latex to be treated, 10 and 11 indicate respectively the inlet and the outlet for the heating fluid circulating in jacket 2.

The latex coming from the polymerization reactor is continuously fed, optionally after preheating, through line 9 to chamber 3, and from there through the holes 5 in distributor 4, to the inside of the vertical pipe 1, on the inside surface of which the latex flows downwardly in the form of a thin film having a thickness ranging from 0.5 to 1.2 mm, at a temperature of from 40° to 70° C., and under a pressure of from 45 to 210 mm Hg. This pressure is the residual pressure existing in the inside of the pipe 1 due to the suction exerted, as explained hereinbefore, via line 7.

The latex is made to flow on and along the inside surface of the vertical pipe 1 for a time between 10 and 70 seconds.

The vinyl chloride monomer removed via line 7 is collected, after condensation of the water vapor contained therein, in a gas-holder in order to be recovered and reused.

In the process for extracting vinyl chloride monomer from polyvinyl chloride latexes according to the present invention, the best results are obtained by operating with a latex film having a thickness between 0.5 and 1 mm, at a temperature ranging from 40° to 60° C., and under a pressure ranging from 45 to 140 mm Hg; the flow time preferably varying from 30 to 70 seconds.

In order still better to illustrate the present invention, several specific examples are now given:

EXAMPLE 1

Using apparatus of the type illustrated in FIG. 1 equipped with a distributor of the type illustrated in FIG. 2, a polyvinyl chloride latex, containing 35% by weight of solids (polyvinyl chloride) and 6,000 ppmw of vinyl chloride monomer based on the polyvinyl chloride, was treated.

The vertical pipe 1 was 5 m long and its inside diameter was 40 mm. The distributor had three holes tangential to the inside circumference of pipe 1, shifted 120° from one another, and having a diameter of 3 mm.

The latex was fed at a flowrate of 40 kg/h and inside the pipe was maintained at a temperature of 50° C. under a pressure of 70 mm Hg (vacuum of 690 mm Hg). The latex flowed downwardly uniformly on the inside surface of the pipe 1, thereby wetting the entire inside surface of the pipe 1 which represents the heat exchange surface heated by the fluid circulating in jacket 2.

On such surface the thickness of the latex film was 0.70 mm and its residence time in the pipe 1 was 40 seconds.

The treated latex flowing out from outlet 8 had a content of solids of 36%, and a content of vinyl chloride monomer (VCM) of 500 ppmw. The recovered VCM flowing out from pipe 7 had a water vapor content equal to 1.5 kg/h.

The apparatus was operated continuously for 450 hours under the conditions indicated above. During the operation foams did not form, although no anti-foaming agent had been added to the latex subjected to the treatment.

EXAMPLE 2

Using the same apparatus as in Example 1, a polyvinyl chloride latex containing 35% by weight of solids and 46,000 ppmw of VCM was treated.

The latex was fed at a flowrate of 40 kg/h and was maintained in the inside of pipe 1 at a temperature of 70° C. under a pressure of 210 mm Hg (vacuum of 550 mm Hg).

On the inside surface of pipe 1, the latex film had a thickness of 0.70 mm and its residence time in the pipe 1 was 40 seconds. The latex so treated had a solids content of 38% and a VCM content equal to 2,000 ppmw.

The recovered VCM exhibited a water vapor content equal to 3 kg/h.

Under the above-mentioned conditions the apparatus was operated continuously for 60 hours. During the operation foams did not form, although no anti-foaming agent was added to the latex subjected to treatment.

EXAMPLE 3

Using the same apparatus as in Example 1, a polyvinyl chloride latex containing 35% by weight of solids and 17,000 ppmw of CVM was treated.

The latex was fed at a flowrate of 40 kg/h and was maintained in the inside of pipe 1 at a temperature of 40° C. under a pressure of 45 mm Hg (vacuum of 715 mm Hg).

On the inside surface of pipe 1 the thickness of the latex film was 0.70 mm and its residence time in the pipe 1 was 40 seconds.

The latex thus obtained had a solids content of 36% and a VCM content of 1,500 ppmw.

The recovered VCM had a water vapor content equal to 1.5 kg/h.

Under these conditions, the apparatus was operated continuously for 450 hours. During the operation foams did not form, although no anti-foaming agent had been added to the latex subjected to the treatment.

EXAMPLE 4

Using the same apparatus as in Example 1, a polyvinyl chloride latex containing 35% by weight of solids and 19,000 ppmw of VCM was treated.

The latex was fed at a flowrate of 20 kg/h and maintained inside the pipe 1 at a temperature of 70° C. under a pressure of 210 mm Hg (vacuum of 550 mm Hg).

On the inside surface of pipe 1 the latex film had a thickness of 0.58 mm and its residence time in the pipe 1 was 65 seconds.

The latex thus obtained had a content of solids of 38% and a content of VCM of 500 ppmw.

The recovered VCM had a water vapor content equal to 3 kg/h.

Under the above-mentioned conditions the apparatus was operated continuously for 60 hours. During the operation foams did not form, although no anti-foaming agent was added to the latex subjected to the treatment.

EXAMPLE 5

Using the same apparatus as in Example 1, a polyvinyl chloride latex containing 35% by weight of solids and 6,000 ppmw of VCM was treated.

The latex was fed at a flowrate of 60 kg/h and was kept in the inside of pipe 1 at a temperature of 50° C. under a pressure of 70 mm Hg (vacuum of 690 mm Hg).

On the inside surface of pipe 1 the latex film was 0.83 mm thick and its residence time in the pipe 1 was 31 seconds.

The latex so treated had a content of solids of 36% and a content of VCM of 1,000 ppmw.

The recovered VCM exhibited a water vapor content equal to 1.5 kg/h.

Under the above-mentioned conditions the apparatus was operated continuously for 10 hours. During the operation foams did not form, although no anti-foaming agent was added to the latex subjected to the treatment.

Modifications and variations can be made in the invention described and illustrated hereinbefore, without departing from its spirit and scope. For example, the apparatus illustrated in FIG. 1 may include a plurality of vertical pipes instead of a single vertical pipe 1.

What is claimed is:

1. A process for extracting vinyl chloride monomer from polyvinyl chloride latexes, consisting essentially of causing continuous gravity flow of the latex under vacuum on a heat exchange surface, said latex being in the form of a thin film having a thickness ranging from 0.5 to 1.2 mm, having a temperature between 40° and 70° C. and being under a residual pressure due to the vacuum ranging from 45 to 210 mm Hg, and removing said monomer concurrently with the flow of said latex, whereby foam formation is substantially prevented.

2. A process according to claim 1, wherein said pressure is varying from 45 to 140 mm Hg.

3. A process according to claim 1, wherein the latex is caused to flow on the heat exchange surface for a time between 30 and 70 seconds.

* * * * *